US012688775B2

(12) United States Patent
Ma et al.

(10) Patent No.: US 12,688,775 B2
(45) Date of Patent: Jul. 21, 2026

(54) PARKING SPACE MANAGEMENT METHOD AND COMMUNICATION APPARATUS

(71) Applicant: TOYOTA JIDOSHA KABUSHIKI KAISHA, Toyota (JP)

(72) Inventors: Jing Ma, Yokohama (JP); Lei Zhong, Chuo-ku (JP); Xiao Shao, Kawasaki (JP); Ryokichi Onishi, Setagaya-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 18/404,573

(22) Filed: Jan. 4, 2024

(65) Prior Publication Data

US 2024/0233540 A1 Jul. 11, 2024

(30) Foreign Application Priority Data

Jan. 6, 2023 (JP) ................................. 2023-001362

(51) Int. Cl.
| | |
|---|---|
| *H04W 4/44* | (2018.01) |
| *G08G 1/14* | (2006.01) |
| *H04B 7/08* | (2006.01) |
| *H04L 5/00* | (2006.01) |
| *H04W 4/06* | (2009.01) |
| *H04W 4/40* | (2018.01) |

(52) U.S. Cl.
CPC ........... *G08G 1/146* (2013.01); *H04B 7/0897* (2013.01); *H04L 5/0055* (2013.01); *H04W 4/06* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 2005/0057373 A1* | 3/2005 | Noguchi | .................. G08G 1/14 705/13 |
| 2012/0092189 A1* | 4/2012 | Jordan | ................... G08G 1/146 340/932.2 |
| 2013/0099943 A1* | 4/2013 | Subramanya | ......... G01S 13/931 340/933 |

(Continued)

FOREIGN PATENT DOCUMENTS

| | | |
|---|---|---|
| JP | 6502607 B1 | 4/2019 |
| JP | 2020-166459 A | 10/2020 |
| WO | WO 2022/238994 A1 | 11/2022 |

OTHER PUBLICATIONS

Ninnemann, et al., "Multipath-assisted Radio Sensing and Occupancy Detection for Smart In-house Parking in ITS", arXiv:2201. 06128v1 [eess.SP], Jan. 16, 2022.

*Primary Examiner* — John F Mortell

(74) *Attorney, Agent, or Firm* — Finnegan, Henderson, Farabow, Garrett & Dunner LLP

(57) ABSTRACT

A parking space management method by a communication apparatus comprises transmitting, a radio signal beamformed in a specific direction, determining that a parking space associated with the specific direction is in a state of being vacant when the communication apparatus receives a response signal in response to the radio signal, and determining that the parking space is in a state of being occupied by a vehicle parked therein when the communication apparatus does not receive the response signal.

19 Claims, 10 Drawing Sheets

(56) References Cited

U.S. PATENT DOCUMENTS

| | | | | |
|---|---|---|---|---|
| 2016/0133125 | A1* | 5/2016 | Sandbrook | G08G 1/012 |
| | | | | 340/933 |
| 2019/0043356 | A1 | 2/2019 | Subramanya | |
| 2019/0353489 | A1 | 11/2019 | Barnard et al. | |

* cited by examiner

FIG. 3

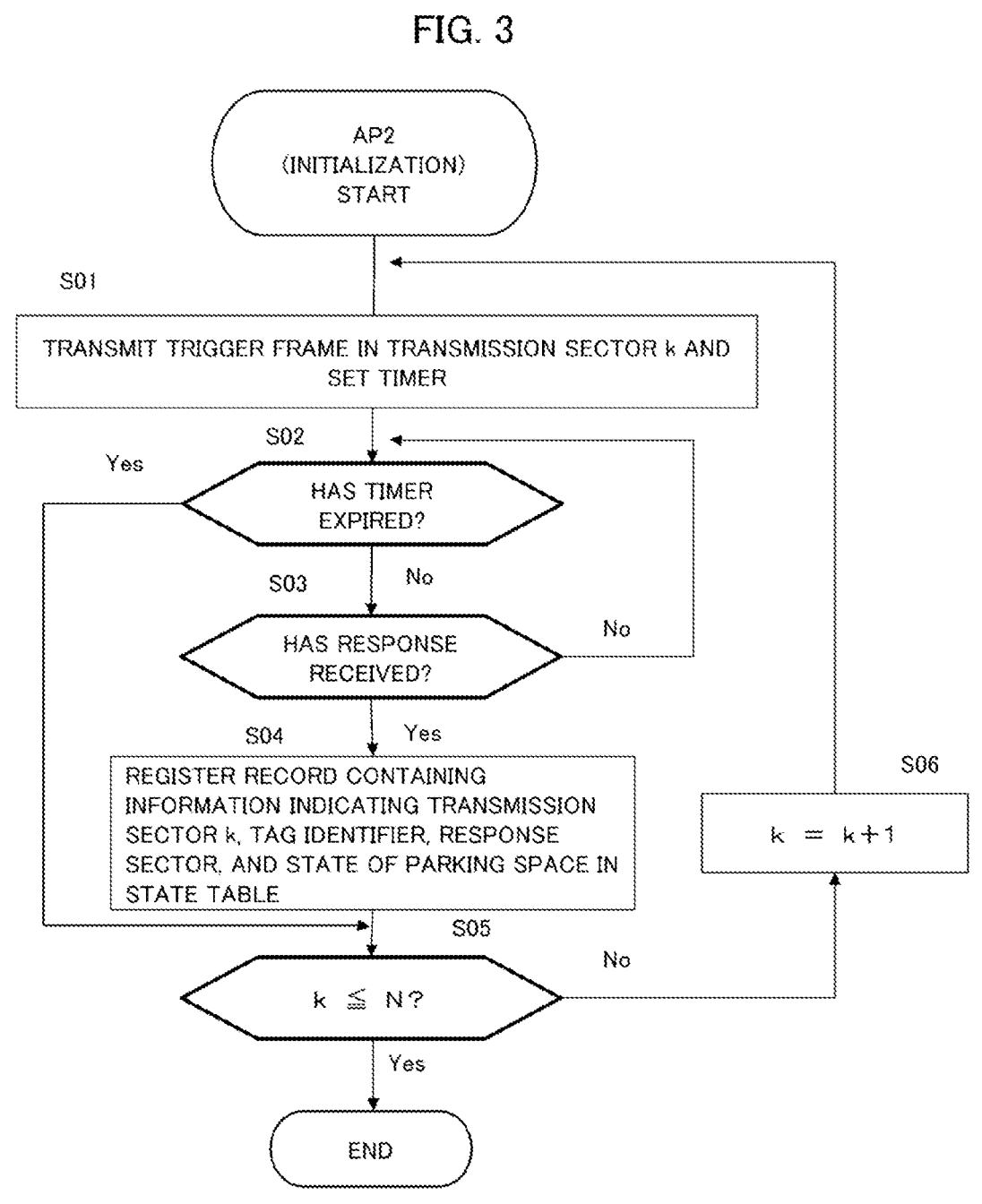

AP2
(INITIALIZATION)
START

S01

TRANSMIT TRIGGER FRAME IN TRANSMISSION SECTOR k AND
SET TIMER

S02

HAS TIMER
EXPIRED?

Yes

No

S03

HAS RESPONSE
RECEIVED?

No

S04

Yes

REGISTER RECORD CONTAINING
INFORMATION INDICATING TRANSMISSION
SECTOR k, TAG IDENTIFIER, RESPONSE
SECTOR, AND STATE OF PARKING SPACE IN
STATE TABLE

S06

$k = k+1$

S05

$k \leqq N?$

No

Yes

END

FIG. 4

STATE TABLE ($k = 0, 1, 2, \cdots, k-1, k$)

| TRANSMITTER | TRANSMISSION SECTOR (TRANSMISSION DIRECTION) | CORRESPONDING TAG | TRANSMISSION SECTOR USED BY CORRESPONDING TAG (RESPONSE SECTOR) | PRESENCE OR ABSENCE OF PARKED VEHICLE (STATE OF PARKING SPACE) |
|---|---|---|---|---|
| AP | TS1 | T1 | RS1 | NONE |
| AP | TS2 | T2 | RS2 | NONE |
| AP | TS3 | T3 | RS3 | NONE |
| * | * | * | * | * |
| AP | TSk | Tk | RSk | NONE |

FIG. 7

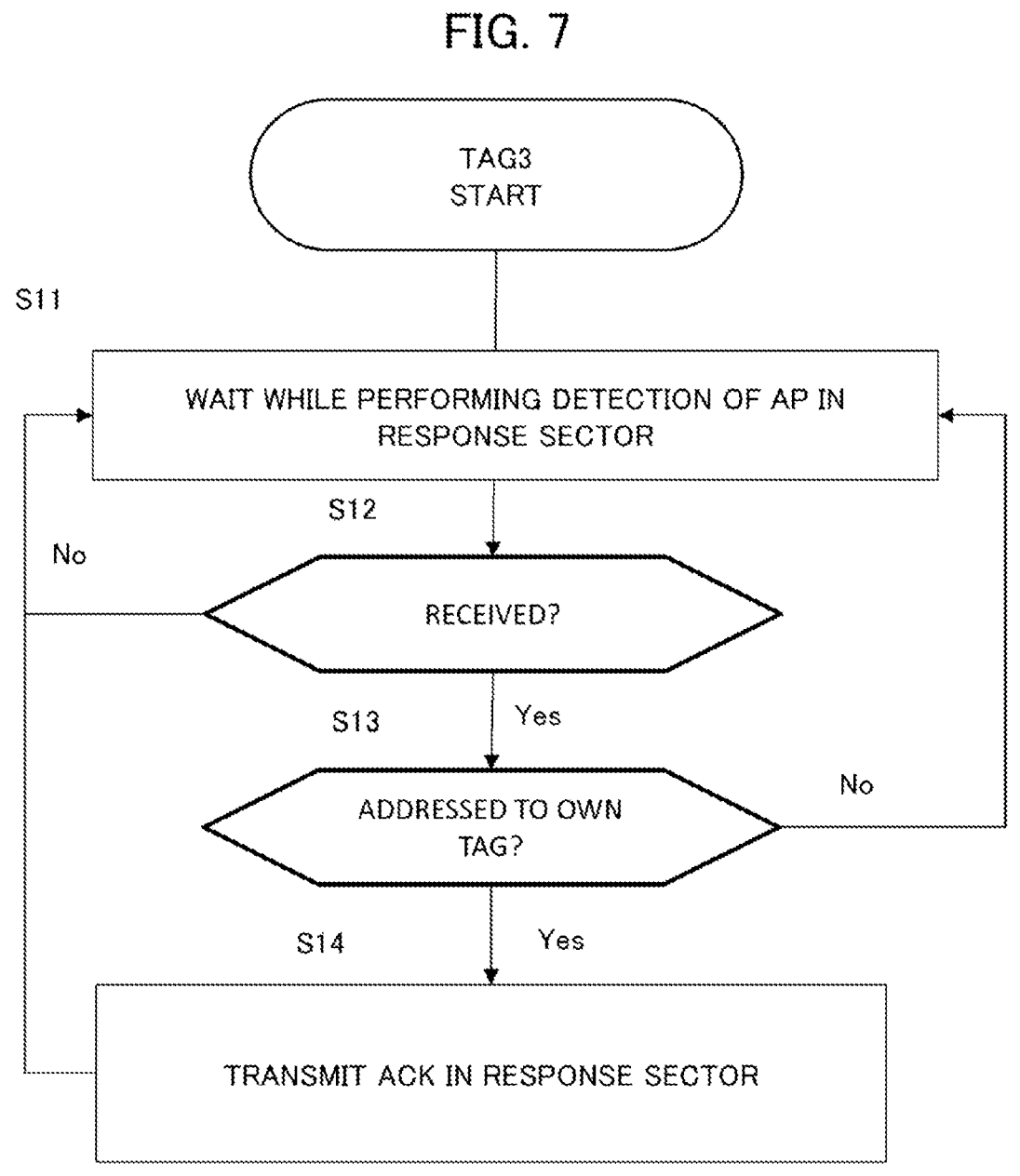

TAG3
START

S11

WAIT WHILE PERFORMING DETECTION OF AP IN
RESPONSE SECTOR

S12

RECEIVED?

No

S13        Yes

ADDRESSED TO OWN
TAG?

No

S14        Yes

TRANSMIT ACK IN RESPONSE SECTOR

FIG. 8A

STATE TABLE (NUMBER OF TRANSMISSION SECTORS)

| TRANSMITTER | TRANSMISSION SECTOR | CORRESPONDING TAG | SECTOR USING CORRESPONDING TAG (RESPONSE SECTOR) | PRESENCE OR ABSENCE OF PARKED VEHICLE |
|---|---|---|---|---|
| AP | TS1 | T1(3a) | RS1 | PRESENCE (OCCUPIED) |
| AP | TS2 | T2(3b) | RS2 | NONE (VACANT) |
| AP | TS3 | T3(3c) | RS3 | PRESENCE |
| AP | TS4 | T4(3d) | RS4 | PRESENCE |
| AP | TS5 | T5(3e) | RS5 | NONE (VACANT) |
| AP | TSk | T6(3f) | RS6 | PRESENCE |

FIG. 9

PARKING SPACE MANAGEMENT METHOD AND COMMUNICATION APPARATUS

CROSS REFERENCE TO THE RELATED APPLICATION

This application claims the benefits of Japanese Patent Application No. 2023-001362, filed on Jan. 6, 2023, which is hereby incorporated by reference herein in its entirety.

BACKGROUND

1. Technical Field

The present disclosure relates to a parking space management method and a communication apparatus.

2. Description of the Related Art

There is a conventional technology such as the one given below (see Japanese Patent Application Publication No. 2020-166459). A transmitter installed in a parking lot transmits transmitter identification information by controlling the turning on and off of a light-emitting unit. An on-vehicle device identifies the position of the on-vehicle device, based on an image of the transmitter captured by the on-vehicle device, calculates a route from the current position of the on-vehicle device to a target position in map data, and outputs the calculated route. In addition, the on-vehicle device notifies a parking lot management device of the position of the on-vehicle device. The parking lot management device stores parking lot management information indicating the position and the state of use of each parking space, and notifies the on-vehicle device of the target position, which is the position of a parking space selected from parking spaces, the usage state of which is vacant. The parking lot management device detects parking to and movement from the parking space, based on the position of the on-vehicle device received from the on-vehicle device, and updates the state of use of the parking space.

As other related arts, please see "Jonas Ninnemann, Paul Schwarzbach, Oliver Michler, "Multipath-assisted Radio Sensing and Occupancy Detection for Smart In-house Parking in ITS", Jan. 16, 2022, URL: https://arxiv.org/abs/2201.06128".

SUMMARY OF THE INVENTION

An object of the present disclosure is to provide a parking space management method with which the presence or absence of a vehicle in a parking space can be determined with a simple configuration, and a communication apparatus.

An aspect of the present disclosure is a parking space management method including: by a communication apparatus, transmitting a radio signal beamformed in a specific direction; and determining that a parking space associated with the specific direction is in a state of being vacant when the communication apparatus receives a response signal in response to the radio signal, and determining that the parking space is in a state of being occupied by a vehicle parked therein when the communication apparatus does not receive the response signal.

Another aspect of the present disclosure is a communication apparatus including: a wireless transmitter/receiver for transmitting a radio signal beamformed in a specific direction; and control circuitry configured to determine that a parking space associated with the specific direction is in a state of being vacant when the wireless transmitter/receiver receives a response signal in response to the radio signal, and determine that the parking space is in a state of being occupied by a vehicle parked therein when the wireless transmitter/receiver does not receive the response signal.

An aspect of the present disclosure may include at least one of a computer program for causing a communication apparatus to perform the above-described parking space management method, a non-transitory storage medium storing the program, and a communication system including the above-described communication apparatus and a terminal.

According to the present disclosure, it is possible to determine the presence or absence of a vehicle in a parking space with a simple configuration.

BRIEF DESCRIPTION OF THE DRAWINGS

FIG. 3 is a flowchart showing an example of processing during initialization of the access point;

FIG. 4 shows an example of a data structure of a state table generated at the access point;

FIG. 7 is a flowchart showing an example of processing at the tag;

FIG. 8A shows an updated state of the state table that has been updated through the processing shown in FIG. 6, FIG. 9 is a sequence diagram showing the interaction between the access point, tags, and terminals mounted on respective vehicles.

DESCRIPTION OF THE PREFERRED EMBODIMENT

Figure 1:
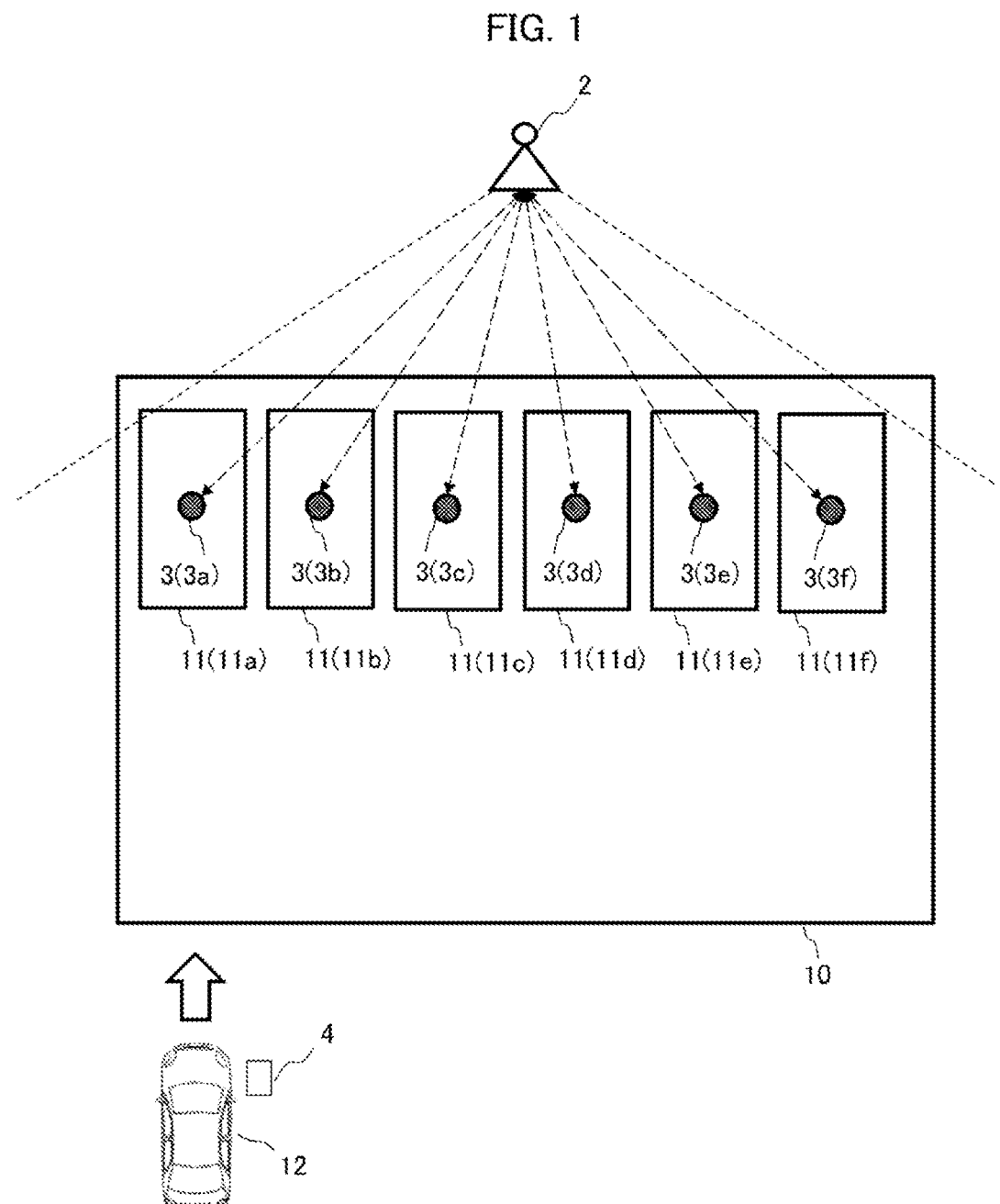
FIG. 1 is a diagram showing an example configuration of a communication system according to an embodiment.

A parking space management method according to an embodiment includes the following steps.

(1) A communication apparatus transmits a radio signal (radio wave) beamformed in a specific direction.

(2) If the communication apparatus receives a response signal to the radio signal, the communication apparatus determines that a parking space associated with the specific direction is vacant, and if the communication apparatus does not receive the response signal, the communication apparatus determines that the parking space is occupied by a vehicle parked therein.

Beamforming is a technique for transmitting or receiving radio waves toward or from a specific direction. The specific direction may be, for example, one or two or more directions in each of which a transmitted radio signal can reach a parking space. Thus, the direction in which a radio signal is transmitted can be associated with the state of a corresponding parking space. The communication apparatus then determines whether a parking space is vacant or occupied based on the presence or absence of a response signal returned in response to a radio signal. Thus, it is possible to determine the presence or absence of a vehicle in a parking space with a simple configuration.

The radio signal is preferably a radio signal in a frequency band ranging from the 28 GHz to 300 GHz bands. Radio waves in the 30 GHz to 300 GHz bands are generally referred to as millimeter waves. In the 5G (fifth generation mobile communication system), the 28 GHz band is also treated as "millimeter waves". Millimeter waves are suitable for high-speed communication. On the other hand, millimeter waves tend to be vulnerable to shielding objects because of their high linearity. Therefore, for example, when the specific direction (transmission direction of a radio signal) is set to a direction in which a radio signal can reach a single parking space, the beamformed radio signal reaches a desired parking space and not other parking spaces. Thus, each parking space can be uniquely associated with the transmission direction of a radio signal.

For example, each parking space is provided with a terminal (communication apparatus) for receiving a radio signal and returning a response signal to the above communication apparatus. The terminal is disposed or installed so as to be shielded and inhibited from receiving a radio signal when a vehicle is parked in that parking space. In a state in which a vehicle is parked, no response signal is returned to (no response signal can be received by) the communication apparatus from the terminal. Therefore, the communication apparatus can determine the presence or absence of a vehicle in the parking space, that is, whether the parking space is occupied or vacant, based on the presence or absence of a response signal from the terminal. In this manner, the state of the parking space can be determined with a simple configuration.

The frequency band applied to the radio signal may be outside the frequency band (ranging from the 28 GHz to 300 GHz bands) treated as millimeter waves. The radio signal shielding configuration may be a configuration in which a shielding object shields the terminal and inhibits the terminal from receiving a radio signal. The shielding object may be located in the parking space or outside the parking space. The shielding object may or may not be a vehicle. For example, the shielding object may be a vehicle parked in the parking space. That is to say, a configuration may be adopted in which a vehicle body of the parked vehicle shields the terminal and inhibits the terminal from receiving a radio signal. Alternatively, the radio signal shielding configuration may be a configuration in which a shielding object that is not a vehicle, for example, a structure provided in the parking space is deformed or displaced as a result of a vehicle being parked in the parking space, thereby shielding the terminal and inhibiting the terminal from receiving a radio signal. The structure and the terminal do not necessarily need to be provided in the parking space, and it is sufficient that the terminal is inhibited from receiving a radio signal or transmitting a response signal as a result of a vehicle being parked in the parking space. Therefore, the specific direction may be a direction other than a direction toward the parking space. The deformation or displacement of the structure can be performed according to the presence or absence of a vehicle parked in the parking space. The presence or absence of a parked vehicle is detected by a sensor, which can be controlled by control circuitry.

The response signal is preferably a radio signal that is beamformed so as to be transmitted in a specific direction in which the communication apparatus is present. The communication apparatus can receive a desired response signal with high accuracy by receiving a radio wave coming from a specific direction. However, beamforming of the response signal is not essential as long as the response signal can be received by the communication apparatus.

For example, reception of a response signal may include receiving a response signal transmitted by a terminal that has received a radio signal in a vacant parking space. Non-reception of a response signal may include not receiving a response signal from a terminal transmitting the response signal due to shielding by a shielding object.

Information indicating a state of the parking space, the information being stored in association with the transmission direction of the radio signal, can be updated with information indicating the state of the parking space obtained through the above-described determination. In addition, the communication apparatus can transmit radio signals beamformed in a plurality of transmission directions, respectively, and store each transmission direction with respect to which a response signal is returned in response to the radio signal, of the plurality of transmission directions, in association with information indicating the state of a parking space corresponding to that transmission direction.

The management method may also include the step of the communication apparatus outputting the information indicating the state of the parking space based on the above-described determination. The outputting includes that the communication apparatus displays or acoustically outputs the information indicating the state. In addition, the outputting may include transmitting the information indicating the state of the parking space using a radio signal in a second frequency band different from a first frequency band used for the transmission of the radio signal. The outputting of the information indicating the state of the parking space may be performed through broadcast transmission. However, the outputting of the information may be performed through unicast transmission to a recipient of the information. Furthermore, the outputting of the information may also include transmission of a radio signal to a vehicle that is desired to be parked. Thus, a user of the vehicle that is desired to be parked can be notified of the state of the parking space.

Hereinafter, a parking space management method and a communication apparatus according to an embodiment will be described with reference to the drawings. Constituent elements of the embodiment given below are illustrative, and the present disclosure is not limited thereto.

Configuration of Communication System

FIG. 1 shows an example of a communication system according to the embodiment. In FIG. 1, a parking lot (parking area) 10 has a parking space 11 for a vehicle 12. In the example shown in FIG. 1, the parking lot 10 has six parking spaces 11a to 11f. However, the number of parking spaces 11 may be one or two or more, and an appropriate number of parking spaces can be adopted. The vehicle 12 may be a human-driven vehicle or an autonomous vehicle.

A wireless LAN (Wi-Fi) access point (AP) 2 is provided for the parking spaces 11a to 11f. The coverage area of radio signals transmitted from the AP 2 (radio waves radiated from the AP 2) covers the parking spaces 11a to 11f.

Each of the parking spaces 11a to 11f is provided with a tag 3 (3a to 3f) for receiving a radio signal from the AP 2 and transmitting a response signal to the AP 2. The AP 2 can detect the tag 3 by transmitting a radio signal toward the tag 3 and receiving a response signal from the tag 3.

The AP 2 is capable of performing beamforming of a radio signal to be transmitted to the tag 3 and transmitting radio signals in various directions (an example of the "specific direction") in which the radio signals can reach the respective tags 3a to 3f. The specific direction associated with each of the tags 3a to 3f is referred to as a "transmission sector". The tags 3a to 3f are also each capable of performing beamforming of a response signal and transmitting a radio wave of the response signal in a direction in which the AP 2 is present. The direction in which the response signal is transmitted is referred to as a "response sector".

In the present embodiment, the AP 2 uses radio signals in the 28 GHz band (millimeter waves) to detect the tag 3. However, microwaves (e.g., quasi-millimeter waves) outside the frequency band treated as millimeter waves may also be used as long as a radio signal can be transmitted in a specific direction through beamforming.

Each of the tags 3a to 3f is disposed or installed at approximately the center of a corresponding one of the parking spaces 11a to 11f in such a manner as to be durable and weatherproof. Each of the tags 3a to 3f is covered and shielded by the vehicle body of a vehicle 12 when the vehicle 12 is parked. However, there are no limitations on the position and the installation method of the tag 3 as long as a configuration can be achieved in which, when a vehicle 12 is parked in the parking space 11, the tag 3 is shielded by the parked vehicle 12 or a structure other than the vehicle 12.

The AP 2 is a radio communication apparatus capable of communicating with the tag 3 and a terminal 4, and is an example of the "communication apparatus". The tag 3 is an example of the "terminal" for transmitting a response signal. The AP 2 may also be referred to as a master unit, and the tag 3 as a slave unit. In the present embodiment, an example is shown in which communication between the communication apparatus and the terminal is performed by wireless LAN (IEEE 802.11 series, including Wi-Fi). However, wireless communication standards other than the wireless LAN may be applied as long as the direction of radio signal transmission can be controlled through beamforming.

The AP 2 can determine the presence or absence of a vehicle 12 parked in the parking space 11 corresponding to the tag 3, or in other words, the state (occupied or vacant) of the parking space 11, based on the presence or absence of a response signal from the tag 3. The AP 2 can output information (referred to as "state information") indicating the state of the parking space 11 obtained through the determination.

In the present embodiment, the AP 2 can broadcast the state information to a vehicle 12 that is present within the coverage area of the AP 2. The vehicle 12 is equipped with a terminal 4, which can receive the broadcasted state information. The terminal 4 can notify a passenger (driver or fellow passenger) of the vehicle 12 of the state information by sound, image, flashing light, or the like, and the passenger can tell a vacant parking space 11 from the state information. The AP 2 can use a frequency band (e.g., Sub6, e.g., 2.4/5 GHz band) different from a millimeter wave band (e.g., 28 GHz band) to communicate with the terminal 4. A frequency band treated as millimeter waves is an example of the "first frequency band", and the 2.5/5 GHz band is an example of the "second frequency band".

The terminal 4 may be a (stationary type) terminal fixed to the vehicle 12, or a portable terminal (portable terminal such as a smart phone or another smart device) held by a passenger. Note that the state information may also be transmitted to a vehicle 12 (terminal 4) outside the coverage area of the AP 2 via a network.

Example Configurations of AP and Tag

Figure 2A:
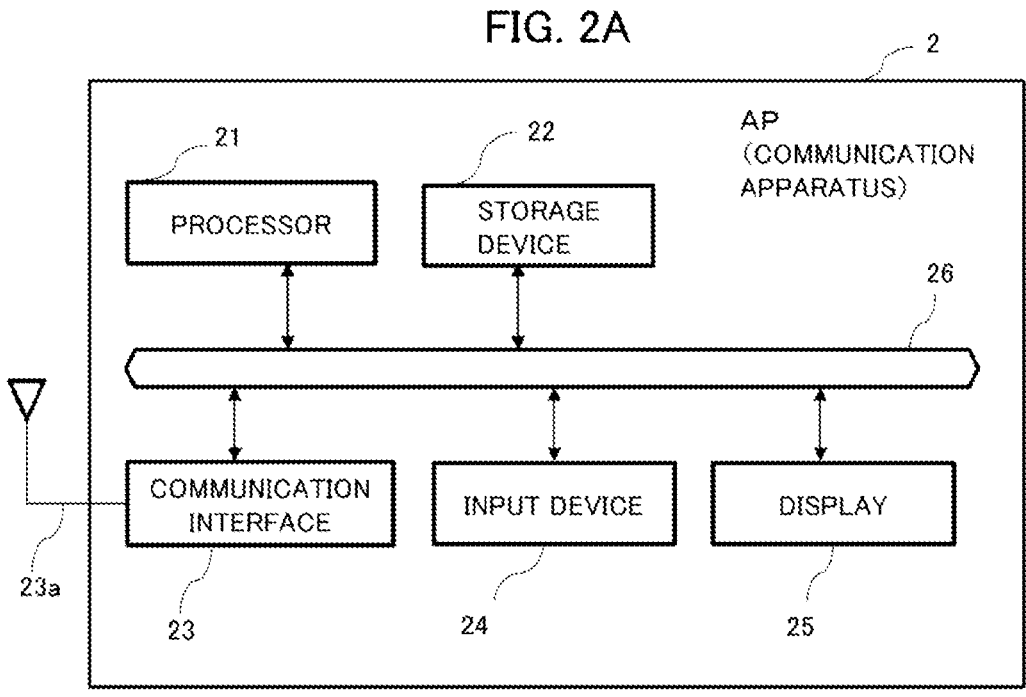
FIG. 2A is a diagram showing an example configuration of an access point (AP)
Figure 2B:
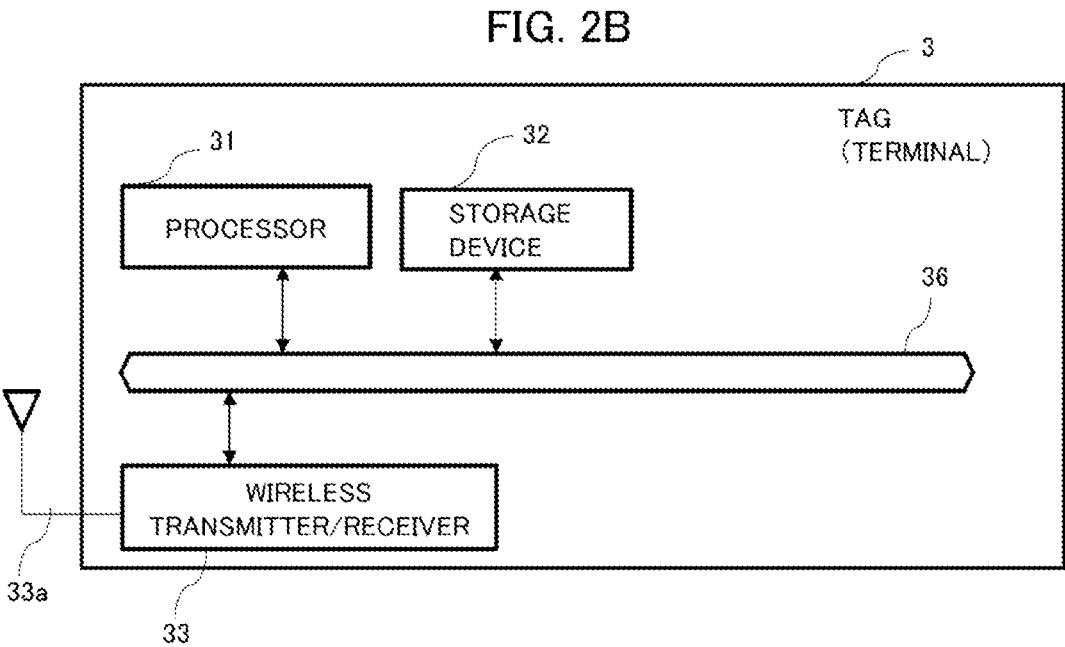
FIG. 2B is a diagram showing an example configuration of a tag.

FIG. 2A is a diagram showing an example configuration of the AP 2, and FIG. 2B is a diagram showing an example configuration of a tag. The AP 2 includes a processor 21 serving as a processing unit, a controller or control circuitry, a storage device 22, and a communication interface 23 (communication IF 23) connected to each other via a bus 26. The AP 2 may also include an input device 24 and a display 25.

The storage device 22 includes a main storage and an auxiliary storage. The main storage is used as at least one of a program and data storage area, an area into which a program is loaded, a work area for a program, a buffer area for communication data, and the like. The main storage is composed of a RAM (random access memory) or a combination of a RAM and a ROM (read-only memory). The auxiliary storage is used as a storage area for data and programs. A non-volatile storage medium is applied to the auxiliary storage. The non-volatile storage medium may be, for example, a hard disk, a solid state drive (SSD), a flash memory, an EEPROM (electrically erasable programmable read-only memory), or the like. The storage device 22 may also include a drive device for disk recording media.

The communication IF 23 is a circuit that performs communication processing. The communication IF 23 includes a wireless transmitter/receiver and an array antenna 23a for transmitting and receiving radio signals and response signals for detection of the tag 3 and for transmitting and receiving radio signals for communication with the terminal 4. The array antenna 23a can be adapted under control of, for example, the processor 21 so that the radio wave radiation is concentrated in a specific direction (is made directional). In other words, a radio signal can be transmitted in a specific direction through beamforming using the array antenna 23a. The communication IF 23 may also include a wireless communication circuit that performs wireless communication with a network (another AP or a base station of a cellular network).

The input device 24 includes a key, a button, a pointing device, a touch panel, and the like, and is used to input information. The display 25 is, for example, a liquid crystal display or the like, and displays information and data.

The processor 21 performs various kinds of processing by executing various programs stored in the storage device 22. For example, the processor 21 performs processing (initialization) for identifying the directions in which the respective tags 3a to 3f (parking spaces 11a to 11f) are present. The processor 21 performs processing for determining the presence or absence of a vehicle 12 in each of the parking spaces 11a to 11f. The processor 21 also performs processing for transmitting the state of each of the parking spaces 11a to 11f (state information) to a vehicle 12.

FIG. 2B is a diagram showing an example configuration of the tag 3. The tag 3 includes a processor 31, a storage device 32, a wireless transmitter/receiver 33, and an array antenna 33a connected to each other via a bus 36. As the processor 31, the storage device 32, the wireless transmitter/receiver 33, and the array antenna 33a, those similar to the processor 21, the storage device 22, and the wireless transmitter-receiver and the array antenna 23a included in the communication IF 23 can be used. For this reason, their description is omitted. The processor 31 performs beamforming using the array antenna 33a so that a response signal is transmitted in a direction (specific direction) in which the AP 2 is present. However, beamforming is not essential as long as the AP 2 can receive the response signal.

Initialization

FIG. 3 is a flowchart showing an example of processing during the initialization of the access point. The AP 2 can transmit radio signals in a plurality of directions (transmission sectors) through beamforming. In the initialization, out of the plurality of directions, a direction in which the tag 3 (parking space 11) is present is detected. In the processing shown in FIG. 3, k represents the number of a transmission sector, and N represents the number of transmission sectors used in the initialization. The processing shown in FIG. 3 is performed by the processor 21 of the AP 2 executing a program stored in the storage device 22. The initialization is executed when all parking spaces 11 to be managed (e.g., parking spaces 11a to 11f) are vacant, for example, outside of opening hours of the parking lot 10.

In step S01, the processor 21 controls the array antenna 23a through beamforming. Under this control, a state in which a radio signal is transmitted in a specific direction corresponding to the current transmission sector k is set. The processor 21 transmits a trigger frame using the wireless transmitter/receiver and the array antenna 23a of the communication IF 23. The trigger frame is a radio frame (radio signal) for detecting the tag 3. The processor 21 sets a timer that counts a predetermined time upon transmission of the trigger frame. The time length of the timer can be set as appropriate.

In step S02, the processor 21 determines whether or not the timer has expired. If it is determined that the timer has expired, the processing proceeds to step S05; if not, the processing proceeds to step S03.

In step S03, the processor 21 determines whether or not a response signal (acknowledge: ACK) to the trigger frame has been received by the array antenna 23a and the wireless transmitter/receiver. If it is determined that the response signal has been received, the processing proceeds to step S04; if not, the processing returns to step S02.

In step S04, the processor 21 generates a record and registers the generated record in the state table (FIG. 4). The record contains information indicating the transmission sector k in which the radio signal has been transmitted, an identifier of the tag 3 included in the response signal, a transmission sector (response sector) indicating the direction in which the response signal has been transmitted, and the state of the parking space 11.

In step S05, the processor 21 determines whether or not the value of the number k of the current transmission sector is less than the number N of transmission sectors. If it is determined that the value of k is less than N, the processor 21 increments the value of k (step S06) and returns the processing to step S01. If it is determined that the value of k is equal to or greater than N, the processing is ended.

As a result of the processing in FIG. 3, information regarding the transmission sector in which the tag 3 (parking space 11) is present, of the plurality of transmission sectors, is registered in the state table. The state table is stored in the storage device 22. However, the state table may be stored (saved) in a location other than the storage device 22.

State Table

FIG. 4 shows an example of a data structure of the state table generated at the access point. The state table is constituted by a plurality of records (entries). The records include a transmitter, a transmission sector, a corresponding tag, a response sector, and information indicating the presence or absence of a parked vehicle. The transmitter is identification information (e.g., SSID) of the AP 2, but an identifier other than SSID may also be used. The transmission sector is information indicating the direction in which a radio signal (trigger frame) is transmitted. The corresponding tag is the identifier of the tag 3 that returned the response signal. The response sector is information indicating a transmission sector (transmission direction) used by the tag 3 when transmitting the response signal to the AP 2, and is a direction in which the AP 2 is present. The information indicating a parked vehicle is information indicating the presence or absence of a vehicle 12 in the parking space 11, or in other words, whether the parking space 11 is occupied or vacant. This information can be managed using, for example, a binary flag (e.g., vacant: "0" and occupied: "1", or vice versa).

In the example shown in FIG. 1, records corresponding to the tags 3a to 3f and indicating transmission sectors, corresponding tags, response sectors, and the presence or absence (NO) of a parked vehicle are registered in the state table. The above-described initial settings (state table in the initial state) can be created using, for example, a beamforming training method according to IEEE 802.11ad.

Parking Space Management Method

Figure 5:
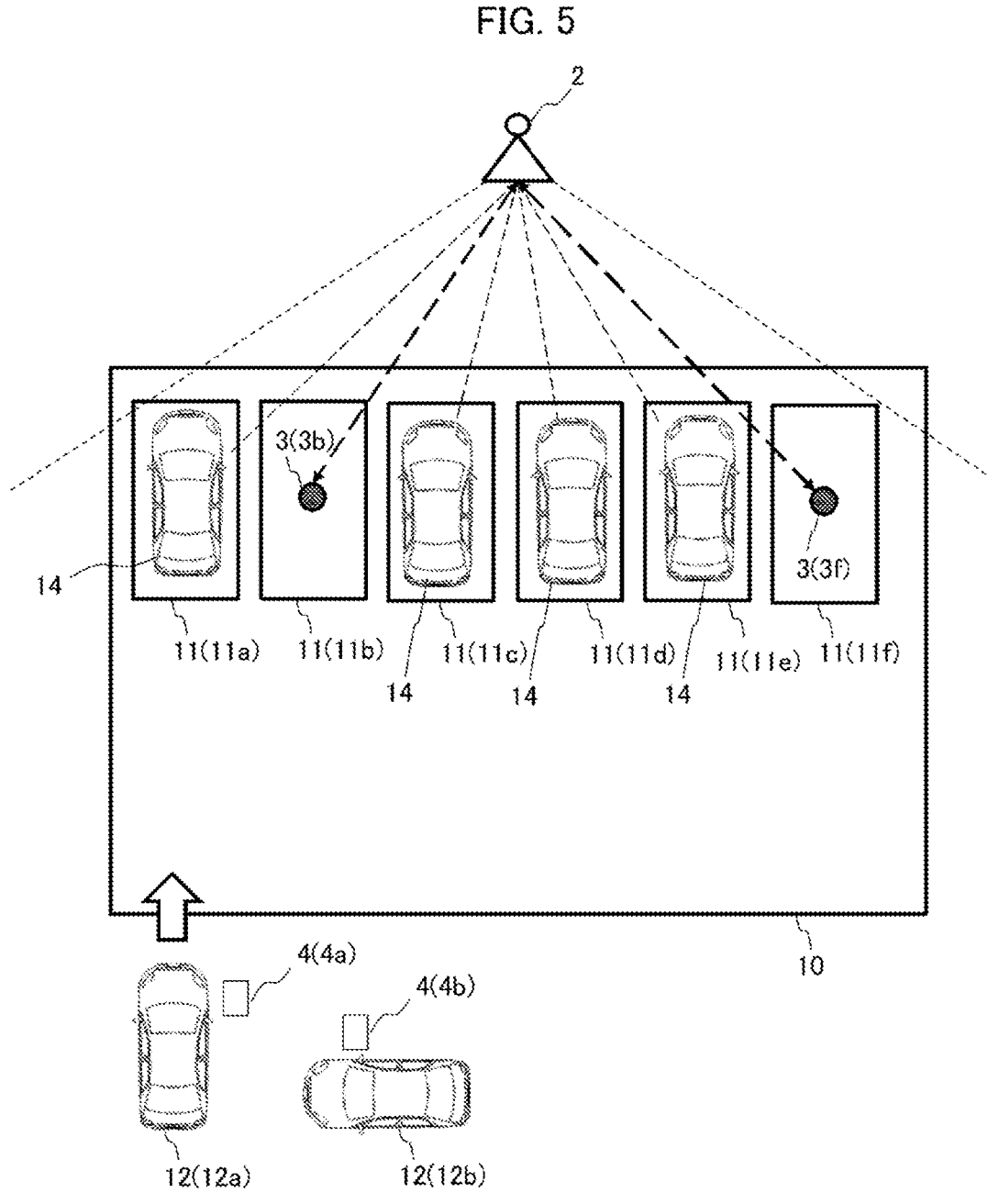
FIG. 5 is a diagram illustrating an example of a parking space management method.

FIG. 5 is a diagram illustrating an example of the parking space management method. FIG. 5 shows an example of the state of use of the parking lot 10 shown in FIG. 1. Of the parking spaces 11a to 11f, the parking spaces 11a, 11c, 11d, and 11e are occupied by vehicles 12. The parking spaces 11b and 11f are vacant. The tags 3a, 3c, 3d, and 3e of the parking spaces 11a, 11c, 11d, and 11e are shielded by the respective vehicles 12 and cannot receive a radio signal from the AP 2. In other words, in this situation, the AP 2 can receive response signals from the tags 3b and 3f. Vehicles 12a and 12b are vehicles whose passengers desire to use the parking lot 10 (enter parking spaces 11), and the vehicles 12a and 12b are equipped with respective terminals 4 (4a and 4b).

Figure 6:
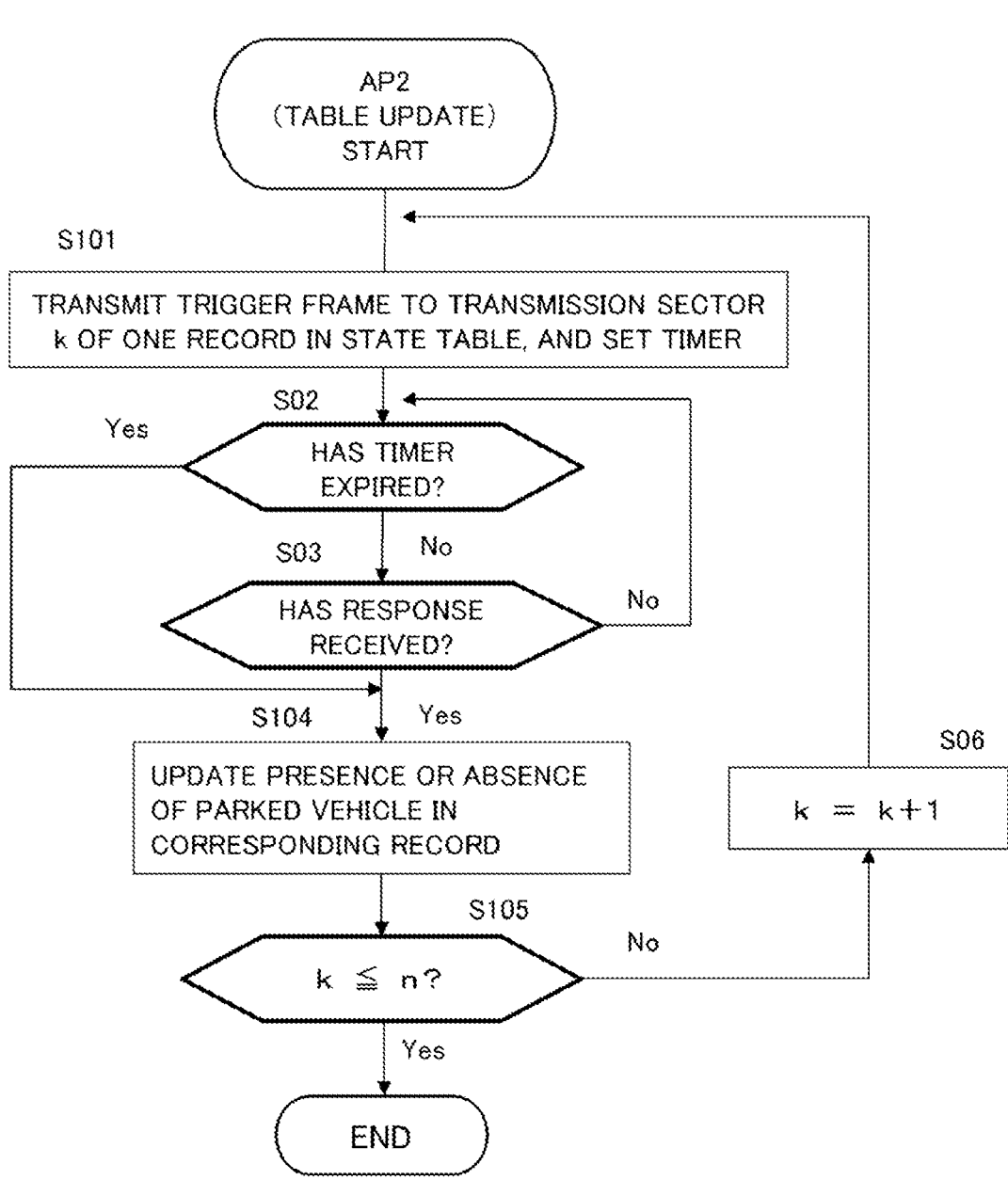
FIG. 6 is a flowchart showing an example of processing for updating the state table at the access point.

FIG. 6 is a flowchart showing an example of processing for updating the state table at the AP 2. The processing shown in FIG. 6 is regularly or periodically executed by the processor 21. The processor 21 determines the presence or absence of a parked vehicle for each record registered in the state table. The records in the state table are referenced in a predetermined order. In the present embodiment, the records are arranged in order of the numbers assigned to the transmission sectors k (k=0 1, . . . , k−1, k), and processing is performed in ascending order of the values of k. However, the records may be processed in any desired order.

In step S101, the processor 21 references a record pointed to by a pointer in the state table. In the first step S101, the pointer points to a record corresponding to the smallest k value. The processor 21 transmits a trigger frame to the transmission sector k in the record and sets a timer. The processor 21 includes, in the trigger frame, the identifier of the tag 3 included in the record.

The processing of steps S02 and S03 is the same as that in FIG. 3 and is therefore not described here. If a response signal (ACK) from the tag 3 has been received before the timer expires, and if the timer has expired, the processing proceeds to step S104.

In step S104, the processor 21 updates the information indicating the presence or absence of a parked vehicle (the state of the parking space 11) in the corresponding record (the record that is being referenced). If the processing proceeds to step S104 because it is determined that the response signal has been received, the processor 21 records information indicating "there is a vehicle" as the information indicating the presence or absence of a parked vehicle (sets a flag "1" that indicates an occupied state).

On the other hand, if the processing proceeds to step S104 because it is determined that the timer has expired, the processor 21 records information indicating "there is no vehicle" as the information indicating the presence or absence of a parked vehicle (sets a flag "0", which may be null, that indicates a vacant state).

In step S105, the processor 21 determines whether or not the value of the number k of the current transmission sector is less than the number n of transmission sectors registered in the state table. If it is determined that the value of k is less than n, the processor 21 increments the value of k (step S06) and returns the processing to step S101. At this time, the pointer in the state table points to a record corresponding to k+1, and processing from step S101 is performed for the next record. In step S105, if it is determined that the value of k is equal to or greater than n, the processing is ended.

FIG. 7 is a flowchart showing an example of processing at the tag 3. The processing shown in FIG. 7 is performed by the processor 31 of the tag 3 executing a program stored in the storage device 32.

In step S11, the processor 31 of the tag 3 regularly or periodically transmits a radio signal for detecting the AP 2 in a response sector, and detects the AP 2 by receiving a response (ACK) from the AP 2. The tag 3 waits for a trigger frame from the AP 2 while performing this processing for detecting the AP 2.

In step S12, the processor 31 determines whether or not a trigger frame from the AP 2 has been received. If it is determined that the trigger frame has been received, the processing proceeds to step S03; if not, the processing returns to step S11.

In step S13, the processor 31 determines whether or not the trigger frame is addressed to its own tag. In other words, the processor 31 determines whether or not the identifier of the tag 3 included in the trigger frame is the identifier of its own tag. If it is determined that the identifier of the tag 3 is the identifier of its own tag, the processing proceeds to step S14; if not, the processing returns to step S11.

In step S14, the processor 31 transmits a response signal (ACK) to the trigger frame in the response sector. The response signal is received by the AP 2. Upon completion of step S14, the processing returns to step S11.

FIG. 8A shows an updated state of the state table after the processing shown in FIGS. 6 and 7. The states of the parking spaces 11b and 11f corresponding to the tags 3b and 3f are updated to "vacant", and the states of the remaining parking spaces 11a, 11c, 11d, and 11e are set to "occupied".

Figure 9:
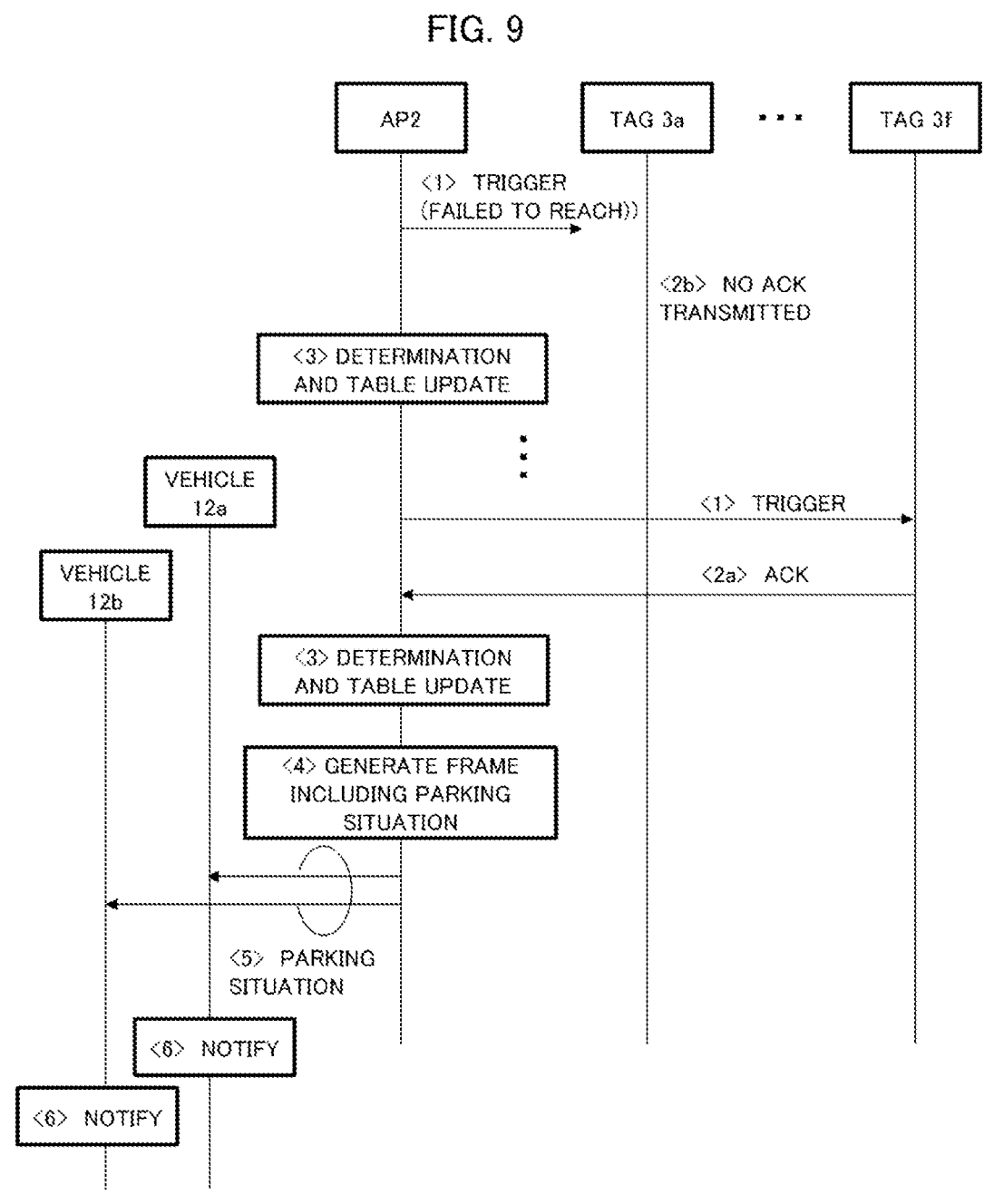

FIG. 9 is a sequence diagram showing the interaction between the AP 2, the tags 3, and the terminals 4 mounted on respective vehicles 12. The AP 2 performs the processing shown in FIG. 6 and transmits a trigger frame to each transmission sector registered in the state table (FIG. 9 <1>). Each tag 3 transmits a response signal (ACK) to the AP 2 (FIG. 9 <2a>) if it receives the trigger frame. However, if a trigger frame does not reach a tag 3 and is not received by the tag 3, the tag 3 does not transmit ACK (FIG. 9 <2b>).

The AP 2 determines the state of the parking space 11 corresponding to each transmission sector based on the presence or absence of ACK that has been received before the timer expires, and updates the state table with the state obtained through the determination (see FIG. 9 <3> and FIG. 6).

The processor of the AP 2 generates a radio signal (beacon frame for reporting the parking situation) including information indicating the states of the parking spaces 11a to 11f in the updated state table (FIG. 9 <4>). The beacon frame is received by all vehicles 12 (terminals 4) belonging to a coverage area of the beacon frame by means of broadcast designation. In other words, the beacon frame for reporting the parking situation is transmitted through broadcasting (FIG. 9 <5>). Broadcasting allows the terminals 4 to receive the parking situation (information indicating a vacant parking space 11) without the need to individually perform a handshake with the AP 2.

The beacon frame is transmitted using a frequency band (e.g., 2.4/5 GHz band) different from the 28 GHz band, which is used for the tag 3 detection. Since this frequency band is a standard frequency band handled by 5G, communication with a 5G-compatible smart device can be easily performed.

Figure 8B:
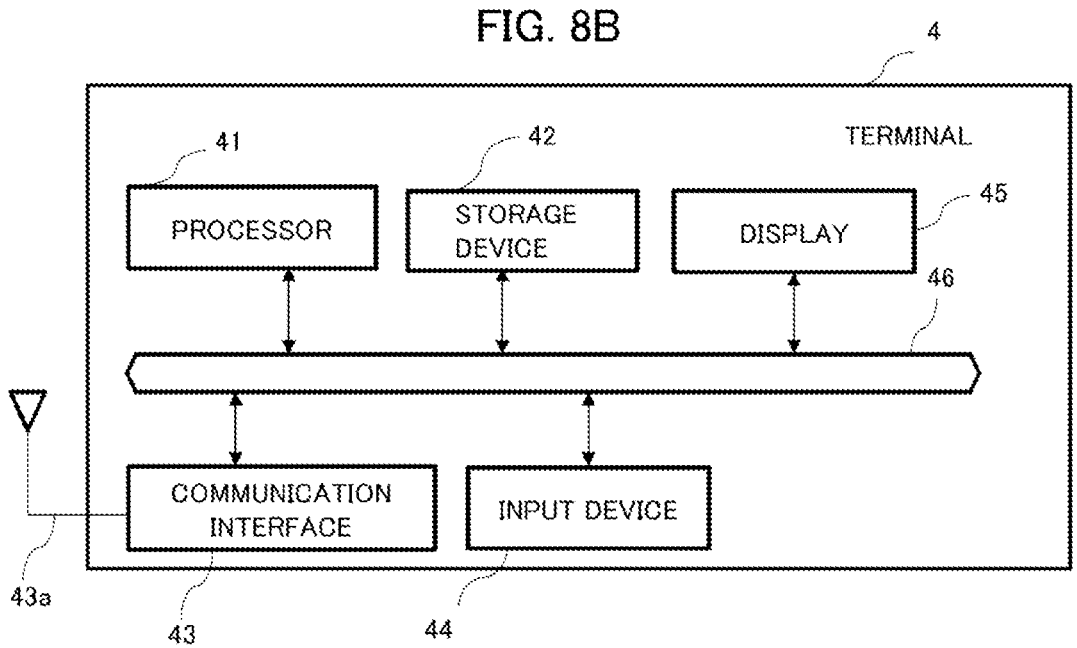
FIG. 8B is a diagram showing an example configuration of a terminal.

The beacon frame is received by the terminals 4 mounted on the respective vehicles 12a and 12b. As shown in FIG. 8B, each terminal 4 includes a processor 41, a storage device 42, and a communication interface 43 (communication IF 43) connected to each other via a bus 46. In addition, each terminal 4 may also include an input device 44 and a display 45.

As the processor 41, the storage device 42, the communication IF 43, the input device 44, and the display 45, those similar to the processor 21, the storage device 22, the communication IF 23, the input device 24, and the display 25 can be used.

At each terminal 4, the beacon frame is received using the communication IF 43. Then, the processor 41 performs processing for displaying information indicating the parking situation included in the beacon frame (information indicating a vacant parking space 11 or information indicating the states of the parking spaces 11a to 11f) on the display 45. The terminal 4 may further have a speaker, and a sound indicating the parking situation may be output from the speaker. Either one or both of the display of the information and the audio output may be performed. The passenger of each vehicle 12 is thus notified of the information indicating the parking situation (FIG. 9 <6>).

Note that processors constituting the processors 21, 31 and 41 are, for example, central processing units (CPUs). CPUs are also referred to as microprocessor units (MPUs). Each processor may have a single processor configuration or a multiprocessor configuration. Furthermore, a single physical CPU connected by a single socket may have a multi-core configuration. The processor may include arithmetic devices with various circuit configurations, such as a digital signal processor (DSP) or a graphic processing unit (GPU). The processor may also have a configuration that cooperates with at least one of an integrated circuit (IC), other digital circuits, analogue circuits, and the like. The integrated circuit includes an LSI, an application specific integrated circuit (ASIC), and a programmable logic device (PLD). The PLD includes, for example, a field-programmable gate array (FPGA). The processors 21 and 41 also include, for example, a microcontroller (MCU), a SoC (system-on-a-chip), a system LSI, and that which is called a chipset or the like.

Effects of Embodiment

In the embodiment, the communication apparatus (AP 2) transmits a radio signal (trigger frame) that is beamformed in a specific direction. In addition, if the AP 2 receives a response signal (ACK) to the trigger frame (if it detects the tag 3), the AP 2 determines that a parking space associated with the specific direction is vacant. On the other hand, if the AP 2 does not receive ACK (if it does not detect the tag 3), the AP 2 determines that the parking space is occupied by a vehicle 12. In this manner, the state (vacant or occupied) of the parking space associated with the specific direction can be determined with a simple configuration, for example, determining the presence or absence of a response signal from the specific direction.

In the embodiment, a frequency band ranging from the 28 GHz to 300 GHz bands (frequency band treated as millimeter waves) is used for the transmission of the trigger frame. Since millimeter waves have the properties of being highly linear and vulnerable to shielding, beamforming makes it possible to avoid a single trigger frame being received by a plurality of tags 3 and thereby uniquely associate a parking space 11 (tag 3) with the direction in which the trigger frame is transmitted.

The AP 2 can determine that a parking space 11 is vacant by receiving a response signal (ACK) transmitted by a tag 3 (terminal) that has received a trigger frame in the vacant parking space 11. On the other hand, the AP 2 can determine that a parking space 11 is occupied if the tag 3 of the parking space 11 is shielded by a vehicle 12 parked therein and ACK therefrom is not received by the AP 2.

In the embodiment, the AP 2 can update information indicating the state of a parking space, the information being stored in association with the transmission direction (transmission sector) of a trigger frame, to the state of the parking space obtained through the determination. Thus, the latest state of the parking space can be acquired.

In the embodiment, during the initialization, the AP 2 transmits radio signals (trigger frames) beamformed in a plurality of transmission directions, respectively. In addition, the AP 2 stores, in the state table (storage device 22), information indicating the correspondence between a transmission direction with respect to which ACK is returned in response to the trigger frame, of the plurality of transmission directions, and the state of a corresponding parking space 11. Thus, the AP 2 can learn and store a transmission sector associated with the state of the parking space.

The AP 2 can output information indicating the state (vacant or occupied) of the parking space 11 based on the above-described determination. In the embodiment, as an example of the outputting, the wireless transmitter/receiver of the AP 2 transmits a radio signal (beacon frame) including information indicating the state of the parking space 11 (parking situation) based on the determination.

The beacon frame can be transmitted using a second frequency band (e.g., Sub6) different from the frequency band (first frequency band) treated as millimeter waves. The beacon frame can be transmitted through broadcasting. However, unicast transmission may also be used. The beacon frame is transmitted to a vehicle 12 that is desired to be parked in the parking lot 10. However, information indicating the state of a parking space 11 may be transmitted to a predetermined communication partner via a network.

The above-described embodiment and modifications are merely examples, and the present disclosure can be appropriately changed and implemented without departing from the gist thereof. In addition, the various steps of processing and means described in the present disclosure can be freely combined unless they are technically inconsistent with each other.

Furthermore, the steps of processing that have been described to be performed by a single device may be shared and executed by a plurality of devices. Alternatively, the steps of processing that have been described to be performed by different devices may be executed by a single device. In a computer system, what hardware configuration (server configuration) is used to realize each function can be flexibly changed. For example, a plurality of devices may be connected via a network and function as the AP 2 described above.

The present disclosure can also be realized by supplying a computer program implementing the functions described in the embodiment above to a computer, and causing one or more processors of the computer to read and execute the program. Such a computer program may be provided to the computer by using a non-transitory computer-readable storage medium that is connectable to a system bus of the computer, or may be provided to the computer via a network. Examples of the non-transitory computer-readable storage medium include any type of disks, such as magnetic disks (floppy (registered trademark) disks, hard disk drives (HDDs), and the like) and optical disks (CD-ROMs, DVD disks, Blu-ray disk, and the like). Moreover, the non-transitory computer-readable medium (non-transitory storage medium) may also include any type of media suitable for storing electronic instructions. Examples of the non-transitory storage medium include read-only memories (ROMs), random access memories (RAMs), EPROMs, EEPROMs, magnetic cards, flash memories, and optical cards.

What is claimed is:

1. A parking space management method by a communication apparatus, which communicates via wireless local area network (LAN), the method comprising:
   transmitting a radio signal beamformed in a plurality of directions which are registered in advance;
   determining that a parking space associated with a first direction in which a response signal is received, is in a state of being vacant when the communication apparatus receives the response signal in response to the radio signal; and
   determining that the parking space is in a state of being occupied by a vehicle parked therein when the communication apparatus does not receive the response signal,
   wherein the non-reception of the response signal includes not receiving by the communication apparatus the response signal within a predetermined time since the transmission of the radio signal due to shielding by a shielding object of a terminal for transmitting the response signal.

2. The parking space management method according to claim 1, wherein transmitting the radio signal includes transmitting the radio signal in a frequency band ranging from 28 GHz to 300 GHz bands.

3. The parking space management method according to claim 1, wherein the reception of the response signal includes receiving the response signal transmitted by a terminal that has received the radio signal in the vacant parking space.

4. The parking space management method according to claim 1, further comprising updating information indicating a state of the parking space to the state of being vacant or the state of being occupied, obtained through the determination, with the information being stored in association with a direction of the plurality of directions in which the radio signal is transmitted.

5. The parking space management method according to claim 4, further comprising:
   storing the first direction in which the response signal is returned in response to the radio signal, the first direction being associated with the state of being vacant.

6. The parking space management method according to claim 1, further comprising outputting information indicating the state of being vacant or the state of being occupied, based on the determination.

7. The parking space management method according to claim 6, wherein the outputting includes transmitting the information by using a radio signal in a second frequency band different from a first frequency band used for the transmission of the radio signal.

8. The parking space management method according to claim 6, wherein the outputting includes transmitting the information through broadcasting.

9. The parking space management method according to claim 6, wherein the outputting includes transmitting the information toward a vehicle that is desired to be parked.

10. A communication apparatus, which communicates via wireless local area network (LAN), comprising:

a wireless transmitter/receiver configured to transmit a radio signal beamformed in a plurality of directions which are registered in advance; and control circuitry configured to:

determine that a parking space associated with a first direction in which a response signal is received, is in a state of being vacant when the wireless transmitter/receiver receives the response signal in response to the radio signal; and determine that the parking space is in a state of being occupied by a vehicle parked therein when the wireless transmitter/receiver does not receive the response signal, wherein the non-reception of the response signal includes not receiving by the communication apparatus the response signal within a predetermined time since the transmission of the radio signal due to shielding by a shielding object of a terminal for transmitting the response signal.

11. The communication apparatus according to claim 10, wherein the radio signal is a radio signal in a frequency band ranging from 28 GHz to 300 GHz bands.

12. The communication apparatus according to claim 10, wherein the wireless transmitter/receiver is configured to receive the response signal transmitted by a terminal that has received the radio signal in the vacant parking space.

13. The communication apparatus according to claim 10, wherein the control circuitry is configured to determine whether or not the wireless transmitter/receiver has received the response signal within a predetermined time since the transmission of the radio signal.

14. The communication apparatus according to claim 10, wherein, when the determining is performed, the control circuitry is configured to update information indicating a state of the parking space to the state of being vacant or the state of being occupied, obtained through the determination, with the information being stored in association with a direction of the plurality of directions in which the radio signal is transmitted.

15. The communication apparatus according to claim 14, the control circuitry is configured to store the first direction in which the response signal is returned in response to the radio signal, the first direction being associated with information indicating the state of the parking space.

16. The communication apparatus according to claim 10, wherein the control circuitry is configured to output information indicating the state of being vacant or the state of being occupied, based on the determination.

17. The communication apparatus according to claim 16, wherein the wireless transmitter/receiver is configured to transmit information indicating the state of being vacant or the state of being occupied, by using a radio signal in a second frequency band different from a first frequency band used for the transmission of the radio signal.

18. The communication apparatus according to claim 16, wherein the wireless transmitter/receiver is configured to transmit the information indicating the state of being vacant or the state of being occupied through broadcasting.

19. The communication apparatus according to claim 16, wherein the wireless transmitter/receiver is configured to transmit the information indicating the state of being vacant or the state of being occupied toward a vehicle that is desired to be parked.

* * * * *